(12) United States Patent
Chanez et al.

(10) Patent No.: US 7,735,776 B2
(45) Date of Patent: Jun. 15, 2010

(54) AIR INLET FOR A TURBOFAN ENGINE

(75) Inventors: Philippe Gerard Chanez, Paris (FR); Pierre Philippe Marie Loheac, Brie Comte-Robert (FR)

(73) Assignee: SNECMA, Paris (FR)

( * ) Notice: Subject to any disclaimer, the term of this patent is extended or adjusted under 35 U.S.C. 154(b) by 194 days.

(21) Appl. No.: 11/627,638

(22) Filed: Jan. 26, 2007

(65) Prior Publication Data

US 2007/0176052 A1    Aug. 2, 2007

(30) Foreign Application Priority Data

Jan. 27, 2006    (FR)    .................................. 06 50297

(51) Int. Cl.
*B64D 33/02*    (2006.01)
(52) U.S. Cl. .................................................. 244/53 B
(58) Field of Classification Search ............... 244/53 B, 244/55, 1 N; 137/15.1, 15.2
See application file for complete search history.

(56) References Cited

U.S. PATENT DOCUMENTS

| | | | |
|---|---|---|---|
| 5,058,617 A * | 10/1991 | Stockman et al. | .......... 137/15.1 |
| 5,702,231 A | 12/1997 | Dougherty | |
| 5,915,403 A * | 6/1999 | McConachie et al. | ...... 137/15.1 |
| 6,708,711 B2 * | 3/2004 | Surply et al. | ................ 137/15.1 |
| 6,764,043 B2 * | 7/2004 | Sankrithi et al. | .......... 244/53 B |

FOREIGN PATENT DOCUMENTS

GB    2 372 019 A    8/2002

* cited by examiner

*Primary Examiner*—Timothy D Collins
*Assistant Examiner*—Valentina Xavier
(74) *Attorney, Agent, or Firm*—Oblon, Spivak, McClelland, Maier & Neustadt, L.L.P.

(57) ABSTRACT

The present invention relates to an air inlet for a nacelle of a jet engine with a front fan, comprising an upper part (115S), a lower part (115I), an inner lateral part (115*int*) and an outer lateral part (ext), defining a leading edge (115) between an external wall (111) of the nacelle and an internal wall (113) forming the air supply channel of the jet engine. According to the invention, the air inlet is characterized in that the leading edge of the outer lateral part (115*ext*) is to the rear with respect to the leading edge of the inner lateral part (115int).

Preferably, the leading edge of the upper part (115S) is likewise to the rear with respect to the leading edge of the lower part (115I).

6 Claims, 2 Drawing Sheets

AIR INLET FOR A TURBOFAN ENGINE

BACKGROUND OF THE INVENTION AND DESCRIPTION OF THE PRIOR ART

The present invention relates to the field of aircraft propelled by at least one jet engine fastened in the vicinity of their fuselage, in particular below a wing, and is aimed at a means for attenuating the noise emitted by the engine.

Noise emissions of civil turbofan engines have two main sources: the jet leaving the nozzle and the noise of the fan at the front. The present invention is concerned with the noise emitted toward the front of the aircraft by the engine.

This noise consists of the superposition of a line spectrum and of a wide-band spectrum: the line spectrum is composed of the multiple frequencies of the passage of the blades (FPB) on the one hand and of the multiple frequencies of the rotation (MFR) on the other hand; moreover, the wide-band spectrum is associated with the turbulent flows in the engine.

The FPB-type noise and the wide-band noise, above, essentially concern the regions on the ground around airports during takeoff and landing operations.

The MFR-type noise is associated with the shock cells generated in transonic flight at the leading edge of the fan blade and is present throughout the takeoff phase until cruising speed has been reached. This type of noise contributes both to the noise perceived on the ground and in the cabin. Specifically, in the case of a conventional air inlet, the MFRs radiate at low frequency and upstream of the engine with maximum directivity between the angles of 60° and 80° with respect to the axis of the engine. The noise is therefore little attenuated by the wall of the fuselage and is transmitted into the front part of the cabin.

The jet engine is housed in a nacelle comprising an air inlet duct oriented along the engine axis, with a generally annular leading edge at the front, having an aerodynamic profile in order to guide the air sucked in by the engine. In order to limit the effects of the noise emitted toward the front by the engine in the direction of the ground, it has been proposed to use nacelles having a beveled inlet profile. The engine inlet plane, also referred to as the hilite plane, is thus inclined toward the rear by elongating the lower part of the air inlet duct. The lower lip extends toward the front of the conventional inlet plane. This form allows a larger fraction of the noise emitted toward the front to be reflected and diverted upward. To achieve this aim, the shape of the inlet profile may also be a scoop shape. Whatever the case, the shape is determined in such a way as not to have a negative influence on the engine performance during the various flight phases. The noise cone envelope is thus modified. The half cone angle in the vertical plane of the lower part is smaller than the half cone angle in this same plane of the upper part. It follows that the region masked by the air inlet duct is more extensive in the lower part. Air inlets suitably configured to attenuate the noise on the ground during landing or takeoff phases are described, for example, in patents EP 823 547, EP 1308387, EP 1071608 and U.S. Pat. No. 3,946,830.

However, this manner of attenuating the noise does not make it possible to produce a favorable effect on the noise perceived in the cabin.

SUMMARY OF THE INVENTION

The objective set by the applicant is therefore to find a simple means of attenuating the noise perceived in the cabin at the front of the engine.

The invention therefore relates to an air inlet for a nacelle of a jet engine with a front fan, comprising an upper part, a lower part, an inner lateral part and an outer lateral part. Said parts between them define a leading edge between an external wall of the nacelle and an internal wall forming the air supply channel of the jet engine. The air inlet of the nacelle is characterized in that the leading edge of the outer lateral part is to the rear with respect to the leading edge of the inner lateral part.

The inner side and the outer side are defined with respect to the position of the nacelle on the aircraft; the inner side is the side situated close to the fuselage and the outer side is the side which is remote therefrom. The front and the rear are defined with respect to the direction of movement of the engine.

The invention therefore makes it possible in a simple manner to reduce the noise perceived in the aircraft cabin by shifting the noise cone outward.

Preferably, the leading edge of the upper part is to the rear with respect to the leading edge of the lower part. This also ensures that the noise is attenuated toward the ground in the flight phases in the vicinity of the airport According to the preferred embodiment, the leading edge connecting the various parts of the inlet forms a plane, the plane being inclined with respect to the axis of the engine.

BRIEF DESCRIPTION OF THE DRAWINGS

An embodiment, which does not limit the invention, will be described with reference to the drawings, in which.

DESCRIPTION OF THE PREFERRED EMBODIMENTS

The nacelle 1, which has been shown schematically, forms the casing of a turbofan engine (not shown) with a front fan. The front is toward the right in FIG. 1. In civil aircraft, such an engine is usually attached below the wing by means of a pylon (not shown here). The nacelle is configured with an aerodynamic profile so as to produce a drag on the outer and inner surfaces that is as small as possible and in order, as far as the intake of air is concerned, to ensure a turbulence-free flow in the various flight phases, particularly during takeoff. There can be seen the external surface 11 of the nacelle, the internal surface 13, represented in broken lines, and a lip 15 forming the junction surface between the first two items. This lip defines the leading edge. The air intake channel defined by the internal surface 13 forms a throat to the rear of the leading edge. There can be seen an upper part 15S of the lip 15 and a lower part 15I with respect to a horizontal plane passing through the axis XX of the engine, itself horizontal here.

Figure 1:
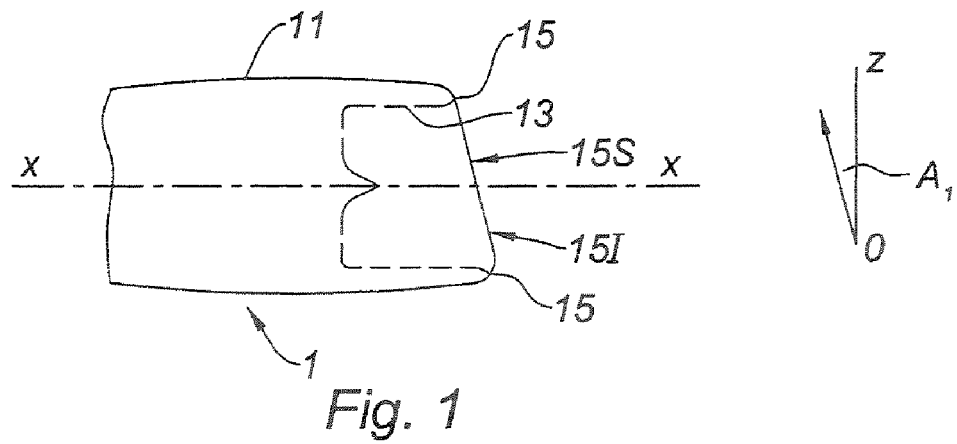
FIG. 1 is a side view showing the front part of a jet engine nacelle.

The nacelle of FIG. 1 has, according to the prior art, a leading edge inclined toward the rear. As can be seen, the upper part 15S is to the rear with respect to the lower part 15I. Preferably, the leading edge is situated in a single plane as is illustrated, but it may also have a nonrectilinear profile. The lower part thus has a larger area for reflecting sound waves upward when the aircraft is in flight. The value of the angle A1, defined between the plane formed by the lip 15 and the vertical direction, is limited by the risks of separation of the airstreams entering the air inlet duct, particularly over the upper part. It is generally considered that the angle A1 must not be greater than 15°.

Figure 2:
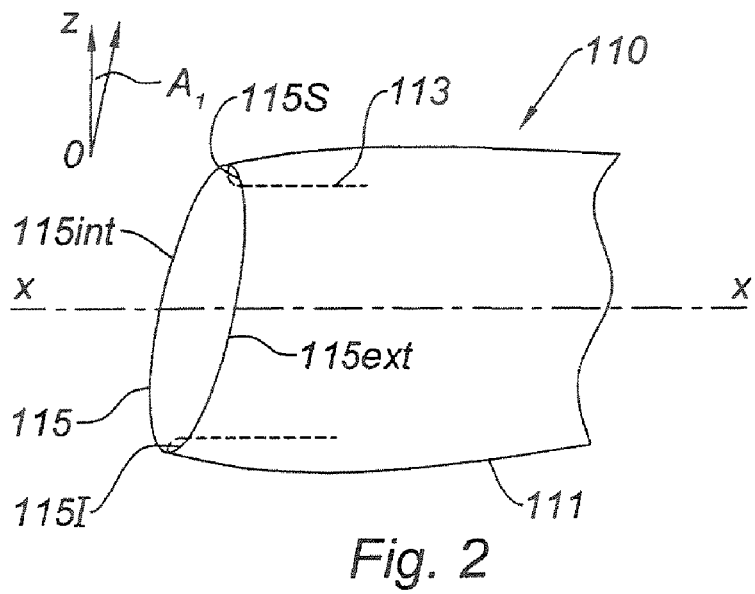
FIG. 2 is a side view, from the outer side, showing the front part of a jet engine nacelle according to the invention.
Figure 3:
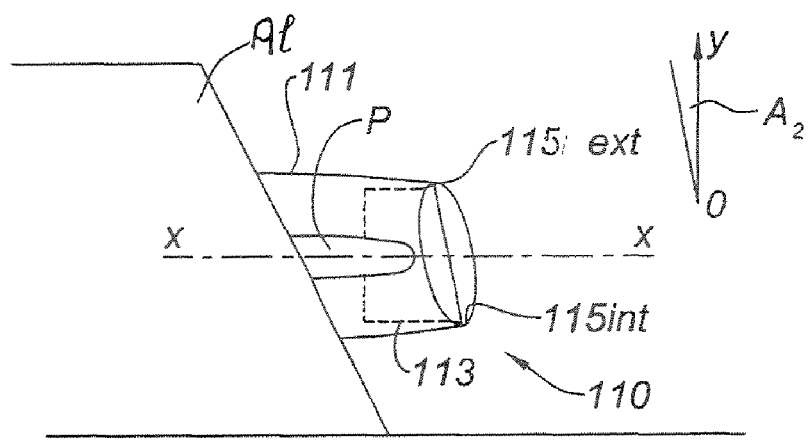
FIG. 3 is a plan view showing the nacelle of FIG. 2 mounted below an aircraft wing.

Referring to FIG. 2, there is shown a nacelle 110 according to the invention, seen from the outer side with respect to the aircraft on which it is mounted. The aircraft is not shown. In FIG. 3, the nacelle 110 is seen from above, attached below a wing A1, in this case the left wing of the aircraft, by means of a pylon P.

This nacelle 110 has the same characteristics as a nacelle of the prior art apart from the air inlet duct. There can be seen the external 111 and internal 113 surfaces and also the lip 115 forming the leading edge of the nacelle 110. As in the previous case, with regard to this embodiment the leading edge of the lower part 115I of the lip 115 is to the front with respect to the leading edge of the upper part 115S.

The nacelle has an outer lateral leading edge 115ext and an inner lateral leading edge 115int which are situated on one and the other side of a vertical plane passing through the axis of the engine. The outer and inner edges are defined with respect to the position of the nacelle on the aircraft. For example, in the case of a nacelle mounted on the right side of the aircraft, the outer leading edge is the right lateral leading edge of the nacelle and the inner lateral leading edge is the left leading edge thereof.

According to the invention, the outer lateral edge 115ext is to the rear with respect to the inner lateral edge 115int. This arrangement makes it possible to form a greater reflection area on the internal face 113 of the inner lateral part of the air inlet duct. Here the leading edge 115 is in a single plane. This plane is therefore both inclined by an angle A1 with respect to a vertical line $0_z$ passing through the axis of the engine (FIG. 2) and by an angle A2 with respect to a horizontal line $0_y$ perpendicular to the axis of the engine (FIG. 3). The angle may be the same in both cases or different. The invention also covers the case where the angle A1 is zero. The angle A1 is preferably between 0° and 15° and the angle A2 is preferably between 0° and 15°, excluding 0°.

Figure 4:
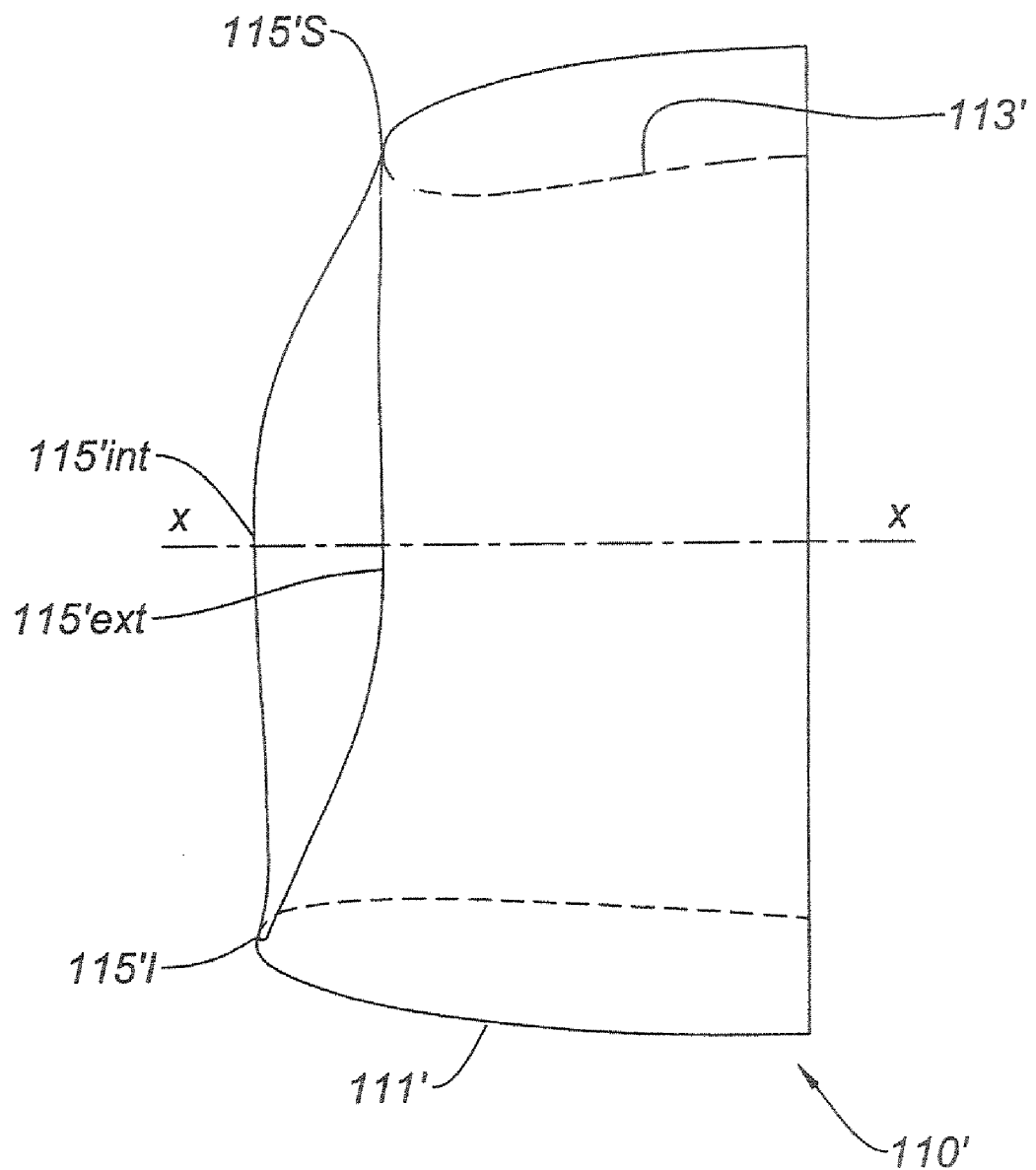
FIG. 4 is a side view, from the outer side, showing the front part of a jet engine nacelle according to the invention wherein the leading edge is not planar.

Moreover, the embodiment of FIGS. 1 to 3 relates to an inlet where the leading edge is in a single plane. However, the invention also covers the case where the leading edge has a scoop shape or is at least in two different planes, or else where the profile of the leading edge is more complex. FIG. 4 depicts such an exemplary embodiment. The elements bear the same reference with the prime indicator.

The internal surface 113 or 113' of the inlet duct is preferably treated with a material designed to absorb sound waves, as is known. Similarly, the profile of the inlet duct, particularly at the leading edge, is configured aerodynamically so as to prevent separations of the airstreams entering the intake channel.

The invention claimed is:

1. An air inlet for a nacelle of a jet engine for an aircraft, said jet engine having a front fan and having a longitudinal axis X-X, said air intake being non-rotatably fixed to and monolithically formed with said nacelle and comprising:

an upper part, a lower part, an inner lateral part and an outer lateral part, together defining a leading edge between an external wall of the nacelle and an internal wall forming the air supply channel of the jet engine, wherein an outer portion of the leading edge located at the outer lateral part is to the rear with respect to an inner portion of the leading edge located at the inner lateral part such that said outer and inner portions of the leading edge are aligned along a horizontal direction that forms a non-zero angle A2 with respect to a horizontal axis perpendicular to said longitudinal axis of said engine, wherein said inner and outer lateral parts are defined with respect to the position of the leading edge of the air intake relative to a fuselage of the aircraft, the inner lateral part being relatively closer to the fuselage and the outer lateral part being further away from the fuselage, and wherein said leading edge of the air intake is configured to shift a noise cone from the front fan outward away from said fuselage, wherein an upper portion of the leading edge located at the upper part is to the rear with respect to a lower portion of the leading edge located at the lower part such that said lower and upper portions of the leading edge are aligned along a direction that forms an non-zero angle A1 with respect to a vertical axis perpendicular to said longitudinal axis of said engine.

2. The air inlet as claimed in claim 1, wherein the leading edge forms a plane, the plane being inclined with respect to the longitudinal axis of the engine.

3. The air inlet as claimed in claim 2, wherein said plane is inclined with respect to the vertical axis by the angle A1 of between 0° and 15°, excluding 0°.

4. The air inlet as claimed in claim 3, wherein said plane is inclined with respect to the horizontal axis perpendicular to the longitudinal axis of the engine by the angle A2 of between 0° and 15°, excluding 0°.

5. The air inlet as claimed in claim 1, wherein the leading edge forms a scoop surface formed of at least two different planes.

6. A turbofan engine comprising a nacelle with an air inlet-according to claim 1.

* * * * *